(12) United States Patent
Zimmermann et al.

(10) Patent No.: US 8,850,748 B2
(45) Date of Patent: Oct. 7, 2014

(54) CABLE FEED DEVICE ON A VEHICLE DOOR, OR FLAT CABLE CONNECTION

(75) Inventors: Detlef Zimmermann, Kürten (DE); Alexander Schidan, Solingen (DE); Hans-Helmut Mieglitz, Monheim (DE); Vedat Nuyan, Wuppertal (DE); Jesus Galan, Düsseldorf (DE); Thomas Schweiker, Wildberg (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 1044 days.

(21) Appl. No.: 12/672,880

(22) PCT Filed: Aug. 11, 2008

(86) PCT No.: PCT/EP2008/006604
§ 371 (c)(1),
(2), (4) Date: Feb. 28, 2011

(87) PCT Pub. No.: WO2009/021706
PCT Pub. Date: Feb. 19, 2009

(65) Prior Publication Data
US 2012/0047806 A1 Mar. 1, 2012

(30) Foreign Application Priority Data
Aug. 10, 2007 (DE) .......................... 10 2007 037 979

(51) Int. Cl.
*B60J 5/04* (2006.01)
*B60R 16/02* (2006.01)

(52) U.S. Cl.
CPC ................................ *B60R 16/0207* (2013.01)

USPC .......................................... 49/502; 296/146.11

(58) Field of Classification Search
USPC .............. 49/502, 475.1, 498.1, 167; 296/208, 296/146.11, 146.12
See application file for complete search history.

(56) References Cited

U.S. PATENT DOCUMENTS 3,848,361 A * 11/1974 Foster et al. ..................... 49/167
4,862,011 A * 8/1989 Wright .......................... 307/10.1
4,941,258 A * 7/1990 Wright ............................ 29/858

(Continued)

FOREIGN PATENT DOCUMENTS

FR 2 819 948 7/2002
WO WO 2006010428 A1 * 2/2006 .............. B60R 16/02

OTHER PUBLICATIONS

Translation of WO 2006010428 A1.*

(Continued)

*Primary Examiner* — Katherine Mitchell
*Assistant Examiner* — Scott Denion
(74) *Attorney, Agent, or Firm* — Foley & Lardner LLP

(57) ABSTRACT

The invention relates to a cable feed device for a flat cable, or a flat cable connection, respectively, on a vehicle door, wherein the flat cable is provided being extended between the vehicle door that can be moved relative toward a vehicle chassis and the vehicle chassis, or along a component, respectively, which is substantially firmly attached to the vehicle chassis, wherein at least one seal is disposed between the vehicle door and the vehicle chassis, or the component, respectively, and further wherein the flat cable is disposed in a feed through of the seal between the seal and the vehicle door in a closed state of the vehicle door.

11 Claims, 3 Drawing Sheets

(56) References Cited

U.S. PATENT DOCUMENTS

| | | | | |
|---|---|---|---|---|
| 5,819,473 | A * | 10/1998 | Hashimoto et al. | 49/502 |
| 6,135,538 | A * | 10/2000 | Serizawa et al. | 296/146.7 |
| 6,354,651 | B1 * | 3/2002 | Mori | 296/146.1 |
| 6,504,262 | B1 * | 1/2003 | Aoki et al. | 307/10.1 |
| 8,231,168 | B2 * | 7/2012 | Toyozumi et al. | 296/208 |
| 2002/0112320 | A1 * | 8/2002 | Hayashi | 16/386 |
| 2009/0145042 | A1 * | 6/2009 | Mieglitz et al. | 49/502 |

OTHER PUBLICATIONS

International Preliminary Report on Patentability issued Mar. 2, 2010 in PCT/EP2008/006604, 5 pages.
International Search Report for PCT/EP2008/006604 completed Dec. 4, 2008.
European examination report received in connection with European application No. EP 08785484.0; dtd Feb. 21, 2013.

* cited by examiner

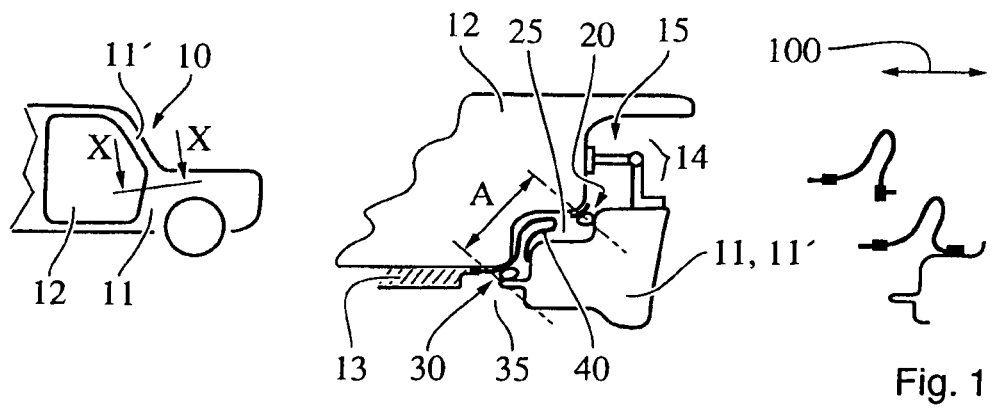
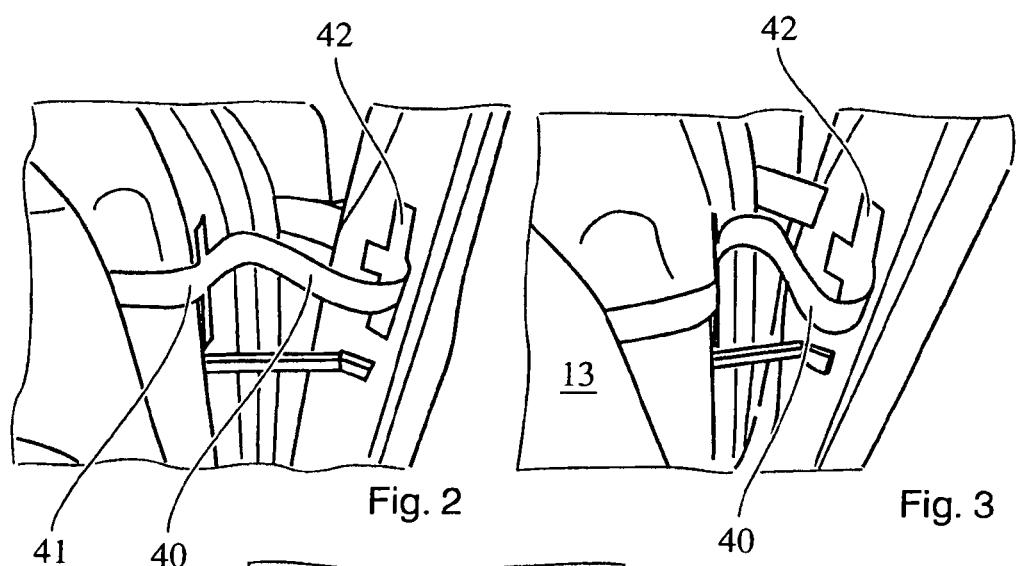
Fig. 2    Fig. 3
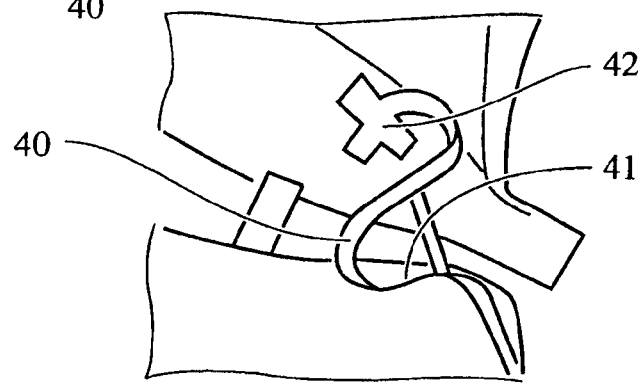
Fig. 4

CABLE FEED DEVICE ON A VEHICLE DOOR, OR FLAT CABLE CONNECTION

CROSS-REFERENCE TO RELATED APPLICATIONS

This application is a National Phase Application of PCT/EP2008/006604, filed Aug. 11, 2008, which claims the benefit and priority of German Patent Application No. 10 2007 037 979.1, filed Aug. 10, 2007. The foregoing applications are incorporated by reference herein in their entirety.

The invention relates to a cable feed device for a flat cable, or to a flat cable connection, on a vehicle door, with the cable connection being provided between the vehicle door, which can move relative to a vehicle chassis, on the one hand and the vehicle chassis or a component which is essentially firmly attached to the vehicle chassis on the other hand, with at least one seal being arranged between the vehicle door and the vehicle chassis or the component.

It is already known to provide vehicles, in particular motor vehicles, with moving, in particular pivotable, vehicle doors, with the electrical and/or electronic components or loads, for example window lifters, door locks, lighting devices, acoustic devices such as loudspeakers or the like, being arranged in or on the vehicle door. In this case, these electrical and/or electronic components or loads are connected to the other electrical components of the vehicle or to the cable harness of the vehicle, for example, by way of a round cable, in particular across or through a portion of the vehicle chassis, in particular the A-pillar and/or the B-pillar. The conventional design of the cable feed device of a cable connection of this type, in particular in the region of a hinge of the vehicle door, sometimes requires the cable to be routed through at least a portion of the vehicle door-side body (that is to say, in particular, metal structural parts of the door) and/or the chassis-side body of the vehicle (in particular the A-pillar, B-pillar or the like), this being associated with increased expenditure on assembly during assembly and final assembly of the vehicle door.

By way of example, document DE 103 35 440 A1 discloses a door subassembly for a motor vehicle having a wet area, a cable harness and a seal, with the seal being arranged directly between the door subassembly and a portion of the motor vehicle which is fixed to the body, with the seal separating a wet area from a dry area, and with the cable harness being routed out of the door subassembly through an opening in the door subassembly and being routed into an opening in the portion which is fixed to the body in the wet area. Threading the cable harness both into the opening in the door subassembly and into the opening in the portion which is fixed to the body during assembly of the motor vehicle door disadvantageously creates a comparatively high level of, and time-consuming, expenditure on assembly.

According to the invention, this expenditure on assembly can be considerably simplified and made more cost-efficient by virtue of the novel design of the cable connection or cable feed device and by virtue of the novel design of the cable itself.

The object is achieved in that the flat cable is arranged in a leadthrough region of the seal between the seal and the vehicle door when the vehicle door is in a closed state, or in that the flat cable is provided so as to run entirely on the interior face of the seal and/or of a further seal. In other words, in that the flat cable is provided so as to always be routed between the seal and the vehicle door-side body or the vehicle-side (in particular metal) structural part, in the region of a seal which seals off the vehicle door from the vehicle chassis when the vehicle door is in the closed state, or in that the flat cable is provided so as to be routed entirely in the interior of the vehicle. According to the first alternative, it is possible here for the flat cable to be routed without any significant esthetically adverse effects in a manner such that simple and easy assembly of the vehicle door is possible. In particular, no complicated assembly step for threading the flat cable through a vehicle door opening in the wet area is required during assembly of the vehicle door, as a result of which additional sealing of this vehicle door opening in the wet area can be saved. In the case of the cable feed device according to the invention, the seal particularly advantageously acts at the same time both to seal off the vehicle door and to seal off the cable leadthrough. According to the second alternative, it is possible here for the flat cable to be designed entirely without the need for special precautions to be taken to protect against splashing water or rain water during assembly, it likewise being possible to save on additional sealing of a cable leadthrough. Therefore, complete preassembly of the flat cable on a lining module is also possible, without the flat cable having to be threaded through an opening in the door shell (or in the wet region) after the lining module is mounted on a door shell, and therefore a comparatively complicated assembly step which, in particular, often needs to be carried out by hand can be completely saved during the assembly process. In the text which follows, the seal is preferably also called an inner seal, and a further seal is also called an outer seal.

According to a further embodiment of the cable feed device, provision is made for the seal to be provided so as to be attached to the vehicle door and/or to the flat cable, preferably by means of a force-fitting, interlocking and/or cohesive connection, with the force-fitting, interlocking and/or cohesive connection particularly preferably comprising a clamping connection and/or an adhesive connection. This particularly advantageously ensures sealing in the leadthrough region, and therefore essentially no moisture can pass along the flat cable from the wet region and enter the dry region. Furthermore, the flat cable is additionally fixed in the leadthrough region by fixing the seal.

According to a further embodiment of the cable feed device, provision is made for the flat cable to be provided so as to run from a vehicle door-side and/or chassis-side dry region to a vehicle door-side and/or chassis-side wet region, with the seal preferably being provided to separate the wet region from the dry region and/or to separate a semi-dry region from the dry region, and therefore electrical and/or electronic components or loads in the vehicle door can particularly advantageously be connected to electrical components of the vehicle or to a cable harness of the vehicle without any esthetically adverse effects in the vehicle door region since the flat cable runs between the vehicle door and the vehicle chassis in the wet region and therefore is not visible from the interior of the vehicle when a vehicle door is closed.

According to a further embodiment of the cable feed device, provision is made for a further seal to be arranged between the vehicle door and the vehicle chassis or the component, with the flat cable preferably being arranged in a further leadthrough region of the further seal between the further seal and the vehicle door when the vehicle door is in a closed state, and with the further seal particularly preferably being arranged between the semi-dry region and the wet region, and/or for the flat cable to be provided so as to run from the vehicle door-side and/or chassis-side dry region to the vehicle door-side and/or chassis-side semi-dry region, and/or for the flat cable to be provided so as to run from the vehicle door-side and/or chassis-side semi-dry region to the vehicle door-side and/or chassis-side wet region. This particularly advantageously allows the flat cable to be routed from the dry region, via the semi-dry region, to the wet region, with no additional seals being required to seal off the flat cable leadthroughs since sealing is provided by the seal at the transition of the flat cable from the dry area to the semi-dry area, and sealing is provided by the further seal at the transition from the semi-dry area to the wet region.

According to a further embodiment of the cable feed device, provision is made for the flat cable to be mechanically firmly connected to the seal in the leadthrough region and/or to be mechanically firmly connected to the further seal in the further leadthrough region, with the respective mechanically firm connection preferably comprising a cohesive connection, and particularly preferably an adhesive connection, and therefore continuous fixing of the seal and, respectively, of the further seal being ensured even in the leadthrough region and, respectively, in the further leadthrough region.

According to a further embodiment of the cable feed device, provision is made for the vehicle door to have a cutout, for routing the flat cable, in the leadthrough region and/or in the further leadthrough region, with the flat cable preferably being adhesively bonded in the cutout. This particularly advantageously provides a substantially rectilinear profile of the seal and, respectively, of the further seal in the region of the leadthrough region and, respectively, of the further leadthrough region, and therefore, for example, the formation of a bulge in the seal or in the further seal due to the flat cable is prevented.

According to a further embodiment of the cable feed device, provision is made for the seal to have a passage cutout and/or a passage opening, for routing the flat cable, in the leadthrough region and/or for the further seal to have a passage cutout and/or a passage opening, for routing the flat cable, in the further leadthrough region, and therefore the flat cable is particularly advantageously able to cross the seal and/or the further seal substantially perpendicular to the profile of the seal and/or of the further seal in a comparatively simple and cost-effective manner. At the same time, the flat cable is sealed off by the seal and/or the further seal in the passage region and/or further passage region.

According to a further embodiment of the cable feed device, provision is made for the seal and/or the further seal to be part of a door seal of the vehicle door, which door seal runs around in a door plane, with the seal and/or the further seal preferably being arranged between abutment points of the peripheral door seal. The peripheral seal is particularly preferably in the form of an elongate flexible element which, together with the seal or the further seal, is arranged to create a completely closed form, with the closed form being oriented, in particular, parallel to the door plane. The seal or further seal is arranged between the abutment points of the rest of the peripheral seal, with the transition points between the ends of the seal or further seal preferably welded and/or adhesively bonded to the abutment points.

According to a further embodiment of the cable feed device, provision is made for the flat cable and the seal and/or the flat cable and the further seal to be provided premounted on a lining module or on the vehicle door. Therefore, the assembly process is particularly advantageously considerably simplified since it is not necessary to thread the flat cable into an opening in the door shell when the lining module is mounted on a door shell.

According to a further embodiment of the cable feed device, provision is made for the flat cable to be provided so as to run within the vehicle door-side or chassis-side dry region, and therefore threading and sealing of the flat cable in a leadthrough region between the dry area and the wet area and/or between the dry area and the semi-dry area can be entirely saved.

According to a further embodiment of the cable feed device, provision is made for a cable tensioning device to be provided for transmitting a mechanical tension to the flat cable, and/or for the flat cable to be provided so as to run at least partially in the manner of a loop and/or in a meandering fashion, and therefore the flat cable is not subjected to any tension, which damages the flat cable, when the vehicle door is opened and at the same time the risk of the flat cable being trapped or kinking when the vehicle door is closed is reduced.

According to a further embodiment of the cable feed device, provision is made for the flat cable to be provided for establishing an electrically conductive connection between electrical and/or electronic components or loads in the vehicle door, in particular on an assembly support or on a lining module of the vehicle door, and electrical components of the vehicle or a cable harness of the vehicle. In particular, the electronic components are mounted on the assembly support and are covered in the direction of the vehicle interior by means of the lining module, and therefore the vehicle door can be assembled by a modular structure of door shell, assembly support and lining module in a comparatively simple and cost-effective manner.

A further subject matter of the present invention is a vehicle door, an assembly support or a lining module for a vehicle door having a cable feed device or flat cable connection according to the invention.

Exemplary embodiments of the invention are illustrated in the drawings and explained in greater detail in the following description.

FIGURES

FIGS. 1 to 4 show schematic views of a cable feed device according to a first embodiment of the present invention.

Figure 5:
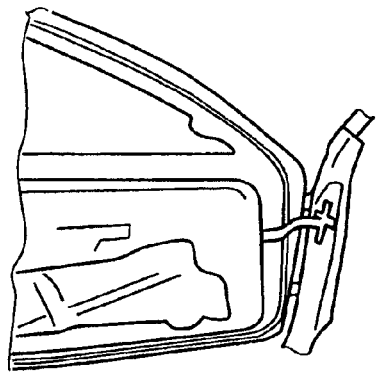
FIGS. 5 to 7 show schematic views of a cable feed device according to a second embodiment of the present invention.

The left-hand portion of FIG. 1 schematically shows a side view of a vehicle or a motor vehicle 10. A vehicle door 12 and the rest of the vehicle 11, which comprises in particular a body or a vehicle chassis, are illustrated here. The vehicle door 12 is provided so as to move relative to the vehicle chassis or to the rest of the vehicle 11. In particular, the vehicle door 12 is arranged such that it can pivot (by means of a hinge) and/or is longitudinally displaceable relative to the vehicle 11. The vehicle door 12 has, in particular, a lining module 13 and/or an assembly support 13. The vehicle door 12 is arranged, in particular, in the region of what is called an A-pillar 11' or adjacent to the A-pillar 11', said vehicle door being the front vehicle door 12 in the illustrated example. However, according to the invention, the vehicle door 12 may also be a rear door 12 of the vehicle 10 (if such a rear door exists). The vehicle chassis is also annotated with reference symbol 11 within the scope of the present invention. The right-hand portion of FIG. 1 shows an (enlarged) sectional illustration along section line X-X which is indicated in the left-hand portion of FIG. 1. In this case, section line X-X is routed substantially horizontally. In a known refinement of vehicle door seals, a first outer seal 20 (also called further seal 20) and a second inner seal 30 (also called seal 30) are provided between the vehicle door 12 and the vehicle chassis. The outer first seal 20 essentially seals the vehicle interior from moisture or splashes of water. The inner second seal 30 provides sealing essentially for the purpose of comfort, in particular for acoustic comfort. A semi-dry region 25 (in the region of extent A) is provided between the first seal 20 and the second seal 30. A wet region 15 is provided outside the first seal 20 (that is to say on that side of the first seal 20 which is averted from the second seal 30). The hinge 14 is also arranged between the vehicle door 12 and the vehicle chassis 11 in the wet region 15, if said vehicle door is a pivotable vehicle door 12. A dry region 35 is provided inside the second seal 30 (that is to say on that side of the second seal 30 which is averted from the first seal 20).

The example of FIG. 1 schematically illustrates a first embodiment of the cable feed device of a flat cable 40. The cable 40 runs from the dry region 35, through a passage region 31 of the second seal 30, into the semi-dry region 25 between the vehicle door 12 and the vehicle chassis 11. In this case, the second seal 30 is generally attached on the chassis side and does not move with the vehicle door 12. When the vehicle door 12 is closed (as illustrated in FIG. 1), the flat cable 40 is then pressed against the vehicle door 12 by the second seal 30. When the vehicle door 12 is in the open state, the flat cable 40 is at least partly stretched and, on account of its flexibility, covers the stretching distance between its attachment point 41 on the vehicle door 12 and its attachment point 42 on the vehicle chassis 11 between the closed or more closed state (cf. FIG. 3) of the vehicle door and the open state (cf. FIG. 2) of the vehicle door. FIG. 4 illustrates the open state of the vehicle door 12 and the course of the cable feed device 1 of the flat cable 40 from a different perspective. In order to cover this stretching distance, the flat cable 40 is provided in the form of a loop. Further possible loop profiles and therefore cable feed devices of the flat cable 40 are indicated in the right-hand part of FIG. 1. The stretching distance is essentially dependent on the radial distance between the attachment points 41 and 42 relative to the pivot point of the hinge and on the maximum opening pivot angle of the vehicle door 12.

Figure 6:
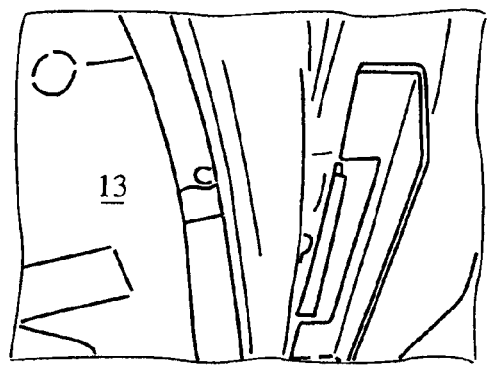
Figure 7:
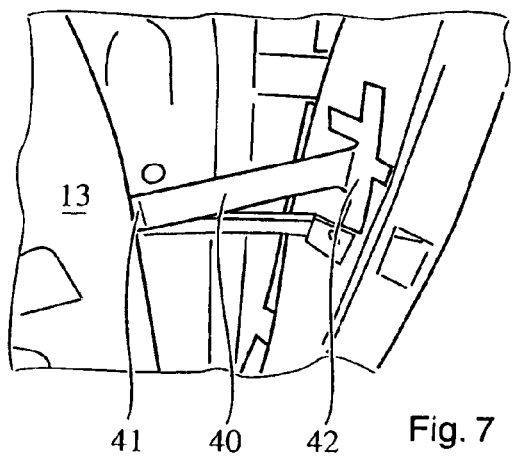

In a second embodiment which is illustrated in FIGS. 5, 6 and 7 and is essentially similar to the first embodiment, it is also possible for the stretching distance to be covered by means of a cable tensioning device. In this case, the flat cable 40 is routed so as to be substantially always stretched between the attachment points 41, 42 or always routed with (slight) tension in such a way that the flat cable 40 assumes a substantially stretched form or cable guidance or a form or cable guidance in which it is stretched at least in subregions. In this case, FIGS. 5 and 7 essentially show the open state of the vehicle door 12 and FIG. 6 shows the at least partially closed state of the vehicle door 12 and the cable feed device 1 of the flat cable 40. In this case, the cable tensioning device provided may be, for example, a mechanical spring, for example a helical spring, which provides a translatory relative movement of the vehicle door 12 relative to the flat cable 40 in order to cover the stretching distance. As an alternative to this, a mechanical rolling-up mechanism, for example as is used in principle in belt retractors, may also be provided, for example, with a rotary relative movement of the vehicle door 12 relative to the flat cable 40 or a portion of the flat cable 40 being provided to cover the stretching distance. As an alternative to mechanical cable tensioning apparatuses, electrical or hydraulic cable tensioning apparatuses may also be provided. In this case, the cable tensioning device may also be provided in the chassis-side body element, for example in the A-pillar.

Figure 8:
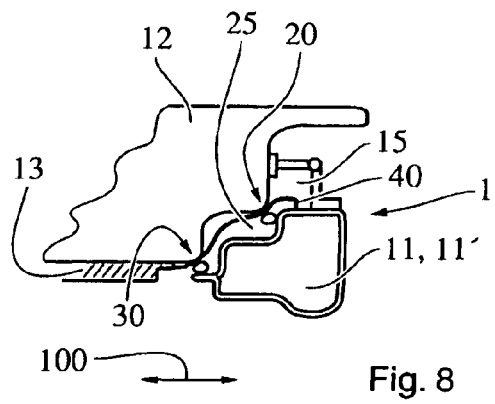
FIG. 8 shows a schematic view of a cable feed device according to a third embodiment of the present invention.
Figure 9:
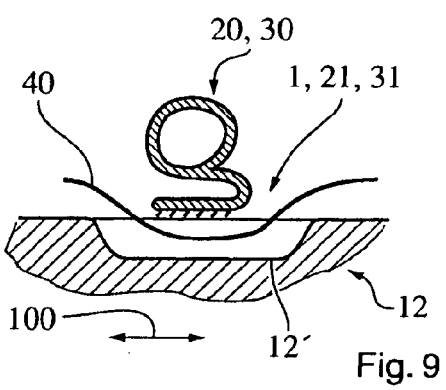
FIGS. 9 to 12 show schematic views of a cable feed device according to a fourth embodiment of the present invention.

FIG. 8 shows a schematic illustration of a third embodiment of the cable feed device 1 of the flat cable 40 in the region between the vehicle door 12 and the vehicle chassis 11 or the A-pillar of the vehicle 10, with the third embodiment being essentially similar to the first embodiment. In this case, in contrast to the first embodiment, the flat cable 40 runs into the wet region 15, that is to say through a further passage region 21 of the first seal 20. In this case, the flat cable 40 always runs between the chassis-side body and the vehicle door-side body in the region of the first seal 20 and therefore does not have to be routed through, for example, an opening in the vehicle door-side body or in a vehicle door-side structural element in an easy-to-assemble manner.

Figure 10:
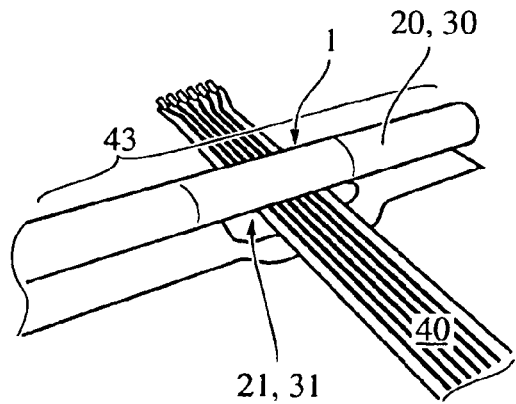
Figure 11:
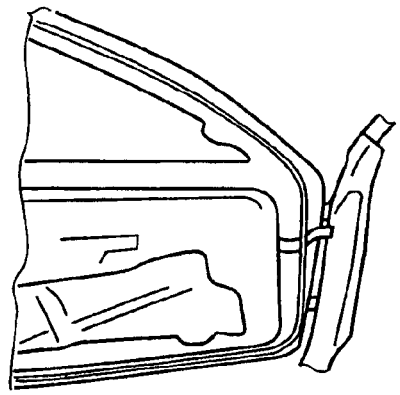
Figure 12:
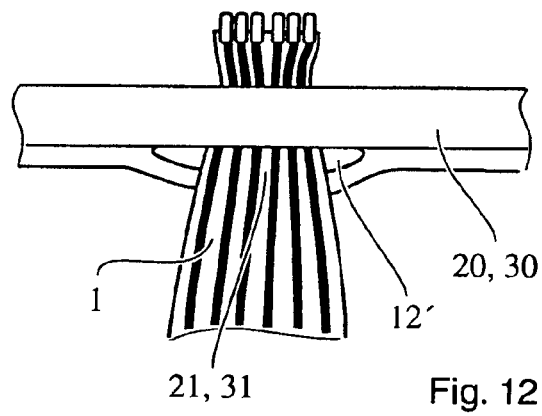
Figure 13:
FIGS. 13 and 14 show schematic views of a cable feed device according to a fifth embodiment of the present invention.

FIGS. 9 to 13 show the cable feed device 1 of the flat cable 40 in the region of the first seal 20 according to a fourth embodiment of the invention, with the fourth embodiment being essentially identical to the third embodiment. However, in this case, the cable feed device 1 provides for the flat cable 40 to be routed through between the vehicle door-side body or a vehicle door-side structural element and the first seal 20 in the sealing region 21. According to the invention, this may be performed, for example, by a portion of the first seal 20 being mounted on the vehicle door 12 together with the flat cable 40 and being imbedded in a cutout 12' in the vehicle door 12 at the intended position. This is illustrated in further detail in FIGS. 10 to 13. The first seal 20 is provided so as to run substantially around the entire vehicle door 12. In this case, a conventional butt joint of the two ends of a first seal 20 of this type is provided, this butt joint being sealed off during assembly, be it by welding the opposite ends of the butt joint or by mortising by means of a connecting element (which can be inserted into the first seal which is provided in the form of a hollow tube seal). According to the invention, a piece 43 of the first seal 20 is firmly connected to the flat cable 40 in the region of the flat cable 40 (FIGS. 10 and 12). During assembly of the vehicle door 12, this piece 43 is inserted into the first seal 20, which is correspondingly interrupted in accordance with the present invention, and therefore a butt joint is produced at each of the ends of the piece 43 of the first seal 20, said butt joints being sealed off in a conventional manner. The flat cable 40 can also be routed through at the second seal 30 in an analogous manner, but this is not illustrated in the figures. FIGS. 11 and 13 show the flat cable 40 being routed through between the first seal 20 and the vehicle door-side body.

Figure 14:
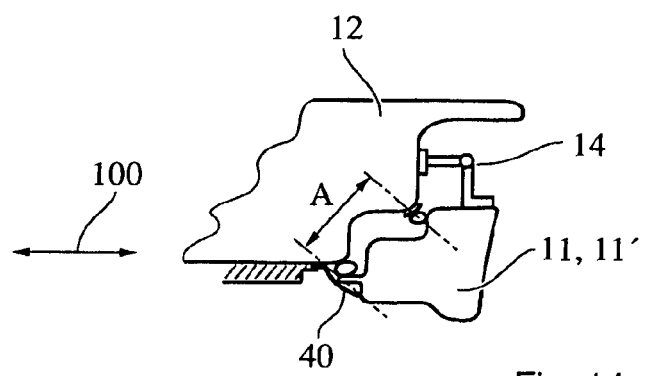

FIG. 14 schematically shows a fifth embodiment of the cable feed device according to the present invention. In this case, the flat cable 40 runs only in the interior of the vehicle 10, that is to say on those sides of the two seals 20, 30 which are averted from the hinge 14. A cable tensioning device can be provided in the same way as in accordance with the second embodiment (FIGS. 5, 6 and 7). According to the invention, provision may be made, particularly in the fourth embodiment of the cable feed device 1, for an interior component, in particular the instrument panel, rather than a chassis-side body element, for example the A-pillar or the B-pillar, to be provided as the second attachment point 42 of the flat cable 40.

According to the invention, the flat cable 40 is firmly connected to the assembly support 13 or to the lining module 13 of the vehicle door before final assembly of the vehicle door 12 according to a first assembly variant. The lining module 13 (and therefore the flat cable 40) is electrically connected or contact-connected, for example by means of a plug connection, relative to electrical and/or electromechanical assemblies in the vehicle door 12 (for example door locks, window lifters or the like) or relative to an assembly support 13 (not illustrated) immediately before (final) assembly of the vehicle door 12 or else during (final) assembly of the vehicle door 12. The assembly support comprises, in a premounted manner, the largest possible number of assemblies to be mounted in or on the vehicle door 12 and is inserted into the vehicle door 12 or connected to the vehicle door 12 during (final) assembly of said vehicle door. According to a second assembly variant, the flat cable 40 is firmly connected to an assembly support (not illustrated) of the vehicle door 12 before final assembly of the vehicle door 12. The assembly support 13 (and therefore the flat cable 40) is electrically connected or contact-connected, for example by means of a plug connection, relative to electrical and/or electromechanical elements of the vehicle door 12 (for example switches, displays or the like) in the lining module 13 immediately before (final) assembly of the vehicle door 12 or else during (final) assembly of the vehicle door.

LIST OF REFERENCE SYMBOLS

1 Cable feed device
10 Motor vehicle, vehicle
11 Rest of the vehicle, vehicle chassis
11' A-pillar
12 Vehicle door
12' Cutout
13 Assembly support, lining module
14 Hinge
15 Wet region
20 Further seal, outer seal
21 Further passage region
23 Piece of the first/second seal
25 Semi-dry region
30 Seal, inner seal
31 Passage region
35 Dry region
40 Flat cable
41 Attachment point on the vehicle door
42 Attachment point on the vehicle chassis
100 Door plane

The invention claimed is:

1. A cable feed device for a vehicle including a vehicle door that is movable relative to a vehicle chassis via a hinge, the device comprising:
a flat cable having a first end and a second end;
a first seal provided between a first portion of the vehicle door and a first portion of the vehicle chassis, such that the first seal separates a first region of the vehicle from a second region of the vehicle, wherein the hinge is located in the first region; and
a second seal provided between a second portion of the vehicle door and a second portion of the vehicle chassis, such that the second seal separates a third region of the vehicle from the second region, wherein the second region is provided between the first and third regions;
wherein the first end of the flat cable is configured to connect to the vehicle door in the third region and the second end of the flat cable is configured to connect to the vehicle chassis in the first region;
wherein the flat cable is routed from the first region to the second region through a first leadthrough region of the first seal provided directly between the first seal and the vehicle door when the vehicle door is in a closed state, and
wherein the flat cable is routed from the second region to the third region through a second leadthrough region of the second seal provided directly between the second seal and the vehicle door when the vehicle door is in a closed state, such that the flat cable is not routed through an opening in a vehicle door-side body or in a vehicle door-side structural element.

2. The cable feed device as claimed in claim 1, wherein at least one of first and second seals is configured to be attached to the vehicle door by an adhesive.

3. The cable feed device as claimed in claim 1, wherein the flat cable is firmly connected to the first seal at a first mechanical connection provided in the first leadthrough region or is firmly connected to the second seal at a second mechanical connection provided in the second leadthrough region, with the mechanical connection comprising at least one of a cohesive connection or an adhesive connection.

4. The cable feed device as claimed in claim 1, wherein the vehicle door has a cutout, for routing the flat cable, in the first leadthrough region or in the second leadthrough region, with the flat cable being adhesively bonded in the cutout.

5. The cable feed device as claimed in claim 1, wherein the first seal has a passage cutout or a passage opening, for routing the flat cable, in the first leadthrough region, and wherein the second seal has a passage cutout or a passage opening, for routing the flat cable, in the second leadthrough region.

6. The cable feed device as claimed in claim 1, wherein the first seal or the second seal is part of a door seal of the vehicle door, and wherein the door seal extends around in a door plane, with the first seal or the second seal being arranged between abutment points of a peripheral door seal.

7. The cable feed device as claimed in claim 1, wherein the flat cable and the first seal or the flat cable and the second seal are provided premounted on the vehicle door.

8. The cable feed device as claimed in claim 1, wherein the flat cable is provided so as to route entirely on an interior face of at least one of the first seal or the second seal.

9. The cable feed device as claimed in claim 1, further comprising a cable tensioning device that is provided for transmitting mechanical tension to the flat cable, and wherein the flat cable is configured to include a loop.

10. The cable feed device as claimed in claim 1, wherein the flat cable is provided for establishing an electrically conductive connection between electrical or electronic components of the vehicle.

11. A vehicle door, assembly support or lining module having a cable feed device as claimed in claim 1.

* * * * *